US008898185B2

(12) United States Patent
Albers et al.

(10) Patent No.: US 8,898,185 B2
(45) Date of Patent: Nov. 25, 2014

(54) TRAJECTORY RETRIEVAL SYSTEM, METHOD AND SOFTWARE FOR TRAJECTORY DATA RETRIEVAL

(75) Inventors: Rob Albers, Nijmegen (NL); Egbert Jaspers, Well (NL); Rob Wijnhoven, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 1650 days.

(21) Appl. No.: 12/160,625

(22) PCT Filed: Feb. 27, 2006

(86) PCT No.: PCT/EP2006/060299
§ 371 (c)(1),
(2), (4) Date: Dec. 15, 2010

(87) PCT Pub. No.: WO2007/096002
PCT Pub. Date: Aug. 30, 2007

(65) Prior Publication Data
US 2011/0106833 A1    May 5, 2011

(51) Int. Cl.
*G06F 17/30*    (2006.01)
(52) U.S. Cl.
CPC .............................. *G06F 17/30811* (2013.01)
USPC ................................... 707/769; 707/E17.003
(58) Field of Classification Search
USPC .......................................................... 707/769
See application file for complete search history.

(56) References Cited

U.S. PATENT DOCUMENTS

| 6,393,358 B1* | 5/2002 | Erzberger et al. ............. 701/120 |
| 6,587,574 B1 | 7/2003 | Jeannin |
| 8,401,773 B2* | 3/2013 | Eagles et al. .................. 701/120 |
| 8,607,353 B2* | 12/2013 | Rippert et al. .................. 726/25 |
| 2003/0053658 A1* | 3/2003 | Pavlidis ........................ 382/103 |

OTHER PUBLICATIONS

Black, J., et al : "Hierarchical Database for a Multi-Camera Surveillance System" Pattern Analysis and Applications, Springer, New York, NY, US, vol. 7, No. 4, XP001233299, ISSN: 1433-7541.

(Continued)

*Primary Examiner* — Shyue Jiunn Hwa
(74) *Attorney, Agent, or Firm* — Michael J. Striker (57) ABSTRACT

Surveillance systems are used in general to monitor buildings, public places, traffic and the like. These systems conventionally comprise a plurality of surveillance cameras producing a large amount of video data. The video data is viewed on-line or recorded and searched through off-line. Especially in the latter case there is a strong need to improve the search speed due to the large amount of the video data. A trajectory data retrieval system 1 for retrieving trajectory data of moving objects in a plurality of image sequences is proposed, the trajectory data retrieval system 1 comprising a database 4 realized for storing a set of common routes based on the trajectories of the moving objects, whereby each subset of the set of common routes is generated by a plurality of trajectories and whereby each subset is linked with the trajectory data of its generating trajectories and/or parts thereof and/or of trajectories overlapping at least in part with the subset, querying means 7 realized to formulate a trajectory-based query and retrieval means 8 realized to retrieve trajectory data linked to a matching subset of the set of common routes matching with the trajectory-based query.

10 Claims, 4 Drawing Sheets

(56) References Cited

OTHER PUBLICATIONS

Jaspers, E G T., et al: "Candela-Storage, Analysis and Retrieval of Video Content in Distributed Systems: Real-Time Video Surveillance and Retrieval" Multimedia and Expo, 2005. ICME 2005. IEEE International Conference on Amsterdam, The Netherlands Jul. 6, 2005, Piscataway, NJ, USA, IEEE, Jul. 6, 2005, pp. 1553-1556, XP010843967, ISBN: 0-7803-9331-7.

Albers A H R., et al: "Smart Search & Retrieval on Video Databases" Consumer Electronics, 2006. ICCE '06. 2006 Digest of Technical Papers. International Conference on Las Vegas, NV, USA Jan. 7-11, 2006, Piscataway, NJ, USA, IEEE, Jan. 7, 2006, pp. 475-476, XP010896711, ISBN: 0-7803-9459-3.

Chiou-Ting Hsu et al: "Motion Trajectory Based on Video Indexing and Retrieval" Proceedings 2002 International Conference on Image Processing. ICIP 2002. Rochester, NY, Sep. 22-25, 2002, International Conference on Image Processing, New York, NY: IEEE, US, vol. 2 of 3, Sep. 22, 2002, pp. 605-608, XP010607396 ISBN: 0-7803-7622-6.

Dimitrios Markus and Tim Ellis, "Path Detection in Video Surveillance" In Image and Vision Computing 20 (2002), pp. 895-903. Elsevier Science 0262-8856-02.

N. Beckmann et al: "The R*-Tree: An Efficient and Robust Access Method for Points and Rectangels" In Proc. of ACM SIG-MOD International Conference on Management of Data, AMY 1990, pp. 322-331.

* cited by examiner

Fig. 4

TRAJECTORY RETRIEVAL SYSTEM, METHOD AND SOFTWARE FOR TRAJECTORY DATA RETRIEVAL

CROSS-REFERENCE

The invention described and claimed hereinbelow is also described in PCT/EP2006/060299, filed on Feb. 27, 2006. This Patent Application, whose subject matter is incorporated here by reference, provides the basis for a claim of priority of invention under 35 U.S.C. 119 (a)-(d).

TECHNICAL FIELD OF THE INVENTION

This invention relates to a trajectory retrieval system for retrieving trajectory data of moving objects in a plurality of image sequences and specifically to a trajectory retrieval system with a database realised for storing a set of common routes based on the trajectories of the moving objects, whereby each subset of the set of common routes is generated by a plurality of trajectories and whereby each subset is linked to the trajectory data of its generating trajectories and/or parts thereof and/or of trajectories overlapping at least in part with the subset. Further, the invention is directed to a respective method and software.

BACKGROUND OF THE INVENTION

Surveillance systems are used in general to monitor buildings, public places, traffic and the like. These systems conventionally comprise a plurality of surveillance cameras producing a large amount of video data. The video data is viewed on-line or recorded and searched through off-line. Especially in the latter case there is a strong need to improve the search speed due to the large amount of the video data.

In the field of moving-objects-tracking it is known to use video content analysis algorithms (VCA) in order to support the search or the retrieval of video data, whereby in a first step the video camera images are segmented into static background and moving objects. In a further step these objects are tracked over time and the locations of the objects in each frame are extracted. The set of locations of each object over the life-time of the object is converted into a trajectory for each object. These trajectories can be stored in a database and used to search through the recorded video camera images.

The document U.S. Pat. No. 6,587,574 B1 discloses a system and a method for representing trajectories of moving objects for content-based indexing and retrieval of visual animated data. The method comprises the steps as elucidated above, whereby a descriptive data structure is generated on the basis of the extracted trajectories and whereby the descriptive data structure comprises at least trajectory data representative for the position, velocity and/or acceleration of the moving object.

The scientific paper from Dimitrios Makris and Tim Ellis with the title "path detection in video surveillance" in "Image and Vision Computing" 20 (2002), pp. 895-903 is addressed to the problem of automatically extracting frequently used pedestrian pathways from video sequences of natural outdoor scenes. This paper discloses to learn path models from the accumulation of trajectory data over long time periods. As an application it is proposed to label common paths, to log moving objects (pedestrians) in respect to the common paths and to predict a pedestrian's location many time steps ahead or to recognise an unusual behaviour of the pedestrian.

SUMMARY OF THE INVENTION

The invention proposes a trajectory data retrieval system for retrieving trajectory data with the features of claim 1, a method for retrieval of trajectory data with the features of claim 10 and a computer program with the features of claim 11, which is especially adapted to perform the method as laid down in claim 10. Preferred and/or advantageous embodiments of the invention are defined in the dependent claims.

The trajectory data retrieval system is an apparatus adapted and/or realised for retrieving trajectory data of moving objects in a plurality of image sequences.

The image sequences are preferably video sequences recorded by video and/or surveillance cameras, which especially monitor relevant locations in an area under surveillance, like traffic crossings, streets, highways, public places, private homes, museums, exhibitions and so on. The cameras are realised as standard video cameras and/or as surveillance cameras for example with expanded field of view (for example 360°-cameras) and/or as cameras sensible, especially exclusively sensible, in the wavelengths of ultraviolet (UV), visible (VIS), near infra-red (NIR), infra-red (IR) and/or far infra-red (FIR) light. Optionally the image sequences are virtual and/or synthetic like VRML-sequences. Preferably the trajectory data retrieval system is connected and/or connectable to a plurality of cameras and/or video recorders.

The moving objects to be monitored are preferably embodied but not limited to traffic participants like pedestrians, cars, busses, trains and the like. Trajectories from moving objects are preferably generated by the steps of segmentation of the image sequences into background, especially static background, and the moving objects and by tracking the moving objects over time and thus over the sequence of the images. Trajectories are especially a spatial or a spatial-temporal representation of the moving objects. Trajectory data is preferably defined as data comprising trajectory information of the moving object, whereby the information includes for example information representative for a position, a velocity and/or an acceleration of the moving object.

The trajectory data retrieval system comprises a database realised for storing and/or comprising a set of common routes based on the trajectories of the moving objects, whereby each subset of the set of common routes is generated by a plurality of trajectories and/or parts thereof. Preferably such a subset is generated by accumulating a plurality of trajectories. The data structure of the database provides that each subset is linked to the trajectory data of its generating trajectories and/or parts thereof and/or of trajectories overlapping at least in part with the subset.

The trajectory data retrieval system comprises querying means which are realised to formulate a trajectory-based query in order to retrieve trajectory data matching with the trajectory-based query. Preferably a trajectory-based query is a query, especially a database query, which is defined by conditions and/or search terms referring to trajectory information.

According to the invention the trajectory data retrieval system is realised to process the trajectory-based query by the retrieval means, whereby the set of common routes is exploited and/or searched on the basis of the trajectory-based query. As a result trajectory data linked with the common routes matching with the trajectory-based query is returned.

Preferably the trajectory data retrieval system is embodied as a video content management system, which comprises a video content analysis (VCA) for generating the set of common routes, the database for storing the set of common routes and the trajectory data and preferably the plurality of image sequences, a processing unit as the retrieval means and a querying interface to input the trajectory-based query.

The underlying idea of the invention is to use a path learning algorithm for retrieval purposes, especially to use the output of the path learning algorithm to check if a query trajectory matches within a common visited route. The output of the path learning algorithm is the set of common routes and the trajectory data retrieval system checks whether or not a query trajectory defined by a trajectory-based query matches with a common route or a subset of the set of common routes. For further features of path learning algorithm and the structure of set of common routes preferably reference is made to the above-introduced scientific paper from Dimitrios Makris and Tim Ellis, which is herewith incorporated by reference in its entirety.

Preferably the trajectory data retrieval system provides means realised for performing the path learning algorithm on video sequences in order to provide the set of common routes. Alternatively means for manually input of the set of common routes and/or means for linking video sequences with the set of common routes are provided.

In a preferred embodiment the set of common routes is represented by a network of connected common routes. Preferably a subset of the set of common routes is embodied as a common route. In a further preferred embodiment, one or each of the common routes and/or the set of common routes and/or the network of common routes is represented by a plurality of connected common nodes. The common nodes comprises entrance and/or exit and/or crossing nodes, and are preferably connected by and/or over the common routes.

In a further embodiment of the invention the querying means and/or the retrieval means comprises translating means realised to translate trajectory-based queries in terms of common routes and/or common nodes. These translating means are especially adapted and/or realised to transform and/or to interpret and/or to encode the trajectory-based queries in this matter. Preferably the trajectory-based queries and/or the common routes are expressed in and/or labelled by the common nodes and/or a sequence of common nodes, especially in and/or by an indexed and/or ordered sequence of common nodes.

Furthermore the querying means preferably provides means for formulating different kinds of search queries, which preferably allow an intuitive search. Non-restricting embodiments are: Area-of-interest query in order to retrieve trajectory data about moving objects passing, entering and/or leaving a selected area of interest. Line-crossing query in order to retrieve trajectory data about moving objects crossing a selected line. Trajectory-by-sketch search in order to retrieve trajectory data about moving objects having a trajectory similar or identical to a sketched trajectory. Trajectory-by-example query in order to retrieve trajectory data about a selected moving object. One-click-trajectory in order to retrieve trajectories which are similar to an example trajectory which is selected by a computer-mouse click or by another typical user input action. The example trajectory is preferably a result trajectory of a prior query. Alternatively an object is selected, the trajectory of the object is retrieved in a first step and in a second step all trajectories similar to the retrieved trajectory of the selected object are retrieved. These or further different kinds of search queries are optionally combinable with further conditions concerning velocity, moving direction, acceleration, colour and/or type of the moving object and/or the like.

Preferably the common routes and/or common nodes and/or representatives or equivalents thereof are used to define an indexing structure for indexing the trajectories and/or the trajectory data and/or the plurality of image sequences, whereby preferably the indexing structure is adapted for retrieval purposes.

Summarized the trajectory data system is preferably realised to allow a user to formulate an intuitive search query, to translate the search query into a search query in terms of common nodes or routes, to exploit a set of common routes in order to find common routes matching the search query, to return trajectory data referring to trajectories linked as generating trajectories to the matching common routes and/or as parts thereof and/or as trajectories overlapping at least in part with the matching common routes and thus returning trajectory data matching the intuitive search query.

In a preferred embodiment the retrieved trajectory data comprises a number of the matched trajectories and/or descriptive information of the matched trajectories and/or links to the image sequences relating to the matched trajectories and/or the image sequences themselves. As a consequence this preferred embodiment allows to retrieve image material of the moving objects matching the search query and thus upgrades the trajectory data retrieval system to a video content management system.

In a further embodiment the database is realised for storing and/or comprising an index of the trajectories and/or image sequences on the basis of an R-Tree and/or R*-Tree algorithm. For the details of these trees reference is made to the paper from N. Beckmann, H. P. Kriegel, R. Schneider, B. Seeger: "The R*-tree: An efficient and robust access method for points and rectangles" in Proc. of ACM SIG-MOD Int. Conf. on Management of Data, May 1990, pp. 322-331. The disclosure of this paper, especially concerning the R*tree, is incorporated herein by reference in its entirety.

Preferably the trajectory data retrieval system is realised so that at least one pre-processing step for indexing the trajectories and/or image sequences on the basis of the set of common routes and/or on the basis of the R-Tree/R*-Tree is performed in common in order to reduce processing time. Preferably the common pre-processing step comprises reducing the numbers of location points of the trajectories by applying a spatial correlation filter algorithm in order to eliminate all location points representing only a linear and/or substantially linear extra- and/or interpolation behaviour of the moving object in the image plane of the image sequence. Alternatively or additionally all locations points are eliminated which do not match a first criteria of a maximum distance between two remaining or filtered location points and/or by a second criteria of a maximum deviation of a moving direction of the moving object between two remaining or filtered positions. For further features and details concerning the pre-processing step, reference is made to the scientific paper from A. Albers, R. Wijnhoven, E. Jaspers and P. d. With, Smart Search & Retrieval On Video Databases, 2006, Digest of Technical Papers, IEEE International Conference on Consumer Electronics (ICCE), Las Vegas, Nev., USA, January, 2006 which is incorporated herein by reference in its entirety.

The underlying problem is also solved by a method with the features of claim 10, preferably performed on the trajectory data retrieval system as laid down in the preceding claims comprising the steps of formulating a trajectory-based query to retrieve the trajectory data and exploiting a set of common routes based on the trajectories of the moving objects, whereby each subset of the set of common routes is generated by a plurality of trajectories and whereby each subset is linked to the trajectory data of its generating trajectories and/or parts thereof and/or of trajectories overlapping at least in part with the subset. Preferably trajectory data linked to a matching subset of the set of common routes is retrieved, whereby the retrieved trajectory data matches with the trajectory-based query.

In a preferred embodiment the method is used in combination with a further method for retrieval of trajectory data from the same plurality of image sequences, whereby the further method comprises the step of exploiting a different descriptive structure indexing the same trajectories and/or video sequences as the set of common routes, whereby the different descriptive structure is preferably realised as an R*-Tree or an improved R*-Tree.

It is further preferred that the trajectory-based query is performed on the set of common routes and parallel on the different descriptive structure in order to achieve a double safety result. Alternatively the trajectory-based query is performed on the set of common routes in a first step and used as a preliminary and early feedback of results to the user before performing the trajectory-based query on the different descriptive structure. Further alternatively the trajectory-based query is performed on the set of common routes in a first step and depending on the search results performed on the different descriptive structure as a second step, whereby the second step is omitted in case the search results of the first step are and/or appear sufficient.

Finally the underlying problem of the invention is also solved by a computer program comprising program code means for performing all the steps of claim 10 when said program is run on a computer and/or on the system as defined by any one of the claims 1 to 9.

BRIEF DESCRIPTION OF THE DRAWINGS

For a more complete understanding of the invention, and the advantages thereof reference is now made to the following descriptions taken into conjunction with the accompanying drawings, wherein similar numbers designate the same object. The drawings show:

FIG. 2a, b images to illustrate a path learning algorithm in spatial and graph representation, FIG. 3 a schematic overview to illustrate filtering of trajectory data preferably used in the video content management system in FIG. 1, FIG. 4 a schematic overview of the hierarchical storing of the filtered trajectory data and the retrieval thereof.

DETAILED DESCRIPTION

Figure 1:
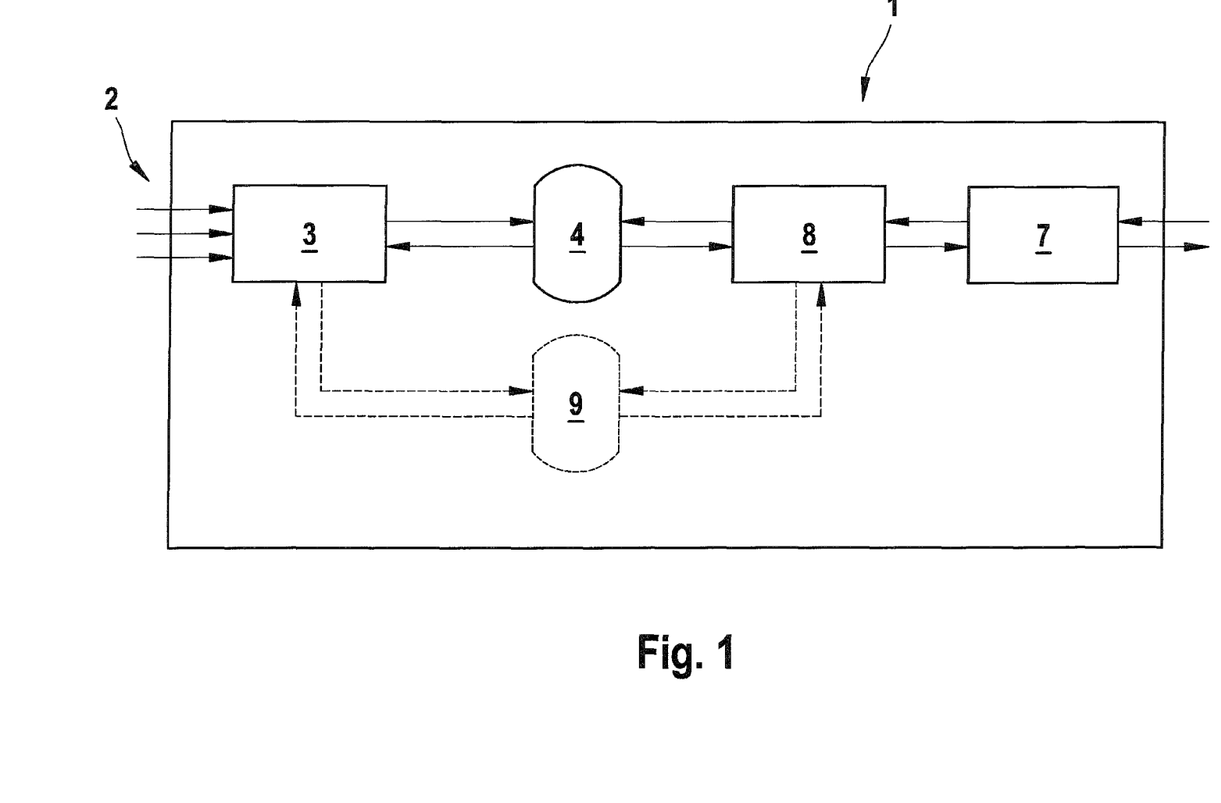
FIG. 1 a video content management system as an embodiment of the invention.

FIG. 1 shows a block diagram of a video content management system—also called VCM-1 as an embodiment of the trajectory data retrieval system. The VCM 1 is connected or connectable at the signal entrance 2 on the left side with a plurality of video cameras or video recorders (both not shown) which provide the VCM 1 with raw material in form of image sequences. The VCM 1 is used for example in surveillance applications, whereby the image sequences show locations to be monitored like streets, public places, airports, museums, prisons and so on.

The image sequences are fed into a video content analysis module VCA 3, which processes the image sequences in order to store the image sequences in a retrieval-friendly manner in the first database 4. The processing comprises the steps of segmenting the images of the image sequences into static background and moving objects and tracking the moving objects over time. In a further step the locations of the objects in each image are extracted. The set of locations of each object over the life-time of the object is converted into a trajectory for each object. Finally the trajectory information is stored in the first database 4.

In order to facilitate retrieval of the trajectory information and the relating image sequences—together preferably called trajectory data—the trajectory information and the video sequences are indexed on the basis of a set of common routes. The set of common routes are preferably created by a path learning algorithm performed on the video sequences in the VCA 3 or are programmed manually. In case of a path learning algorithm, the VCA 3 accumulates similar trajectories into a common route. Such a common route is for example a pathway for passengers, whereby all passengers as moving objects have a similar or identical trajectory. The common routes are merged into a set of common routes with common nodes at relevant points like the entrance or exit of a common route or a crossing of two or more common routes. In case of a manual input the common routes are provided by a user.

Figure 2A:
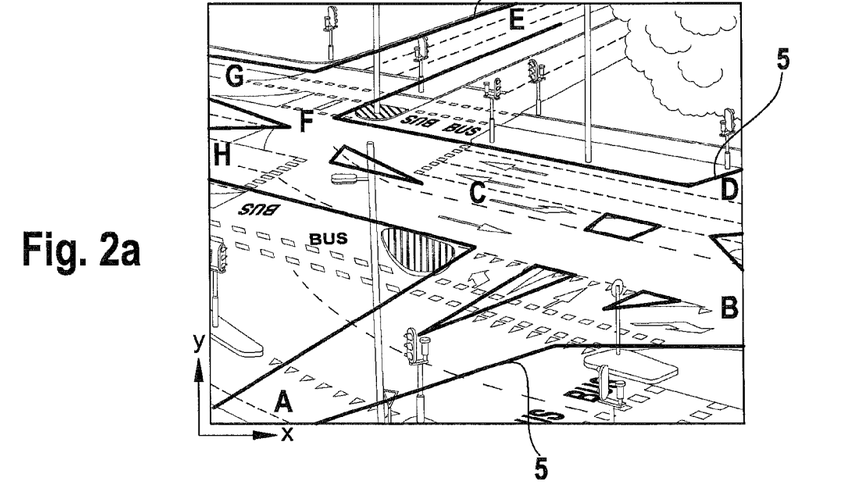
Figure 2B:
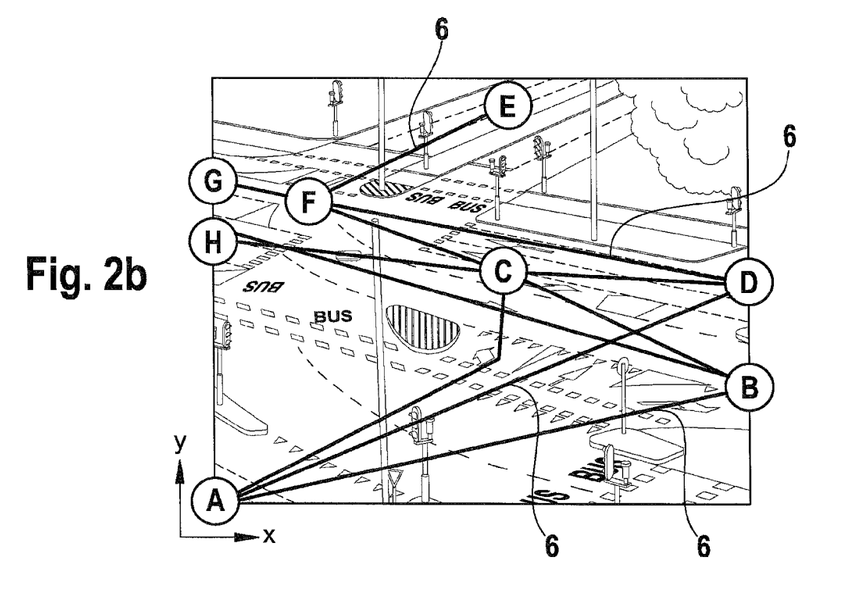

FIG. 2 a and b illustrate a possible result of a path learning algorithm preformed on the trajectories of traffic participants, especially of cars, as moving objects on a traffic scene. FIG. 2a shows the output in spatial representation, whereby the accumulated trajectories lie within borderlines 5 indicating the street and/or further areas in the image where the most moving objects appear. The entrances and exits of the moving objects into or from the traffic scene are indicated by common nodes A, B, D, E, G, H. The common nodes F and C indicate crossings of the common routes. In FIG. 2b the same traffic scene is shown whereby the accumulated trajectories are shown in graph representation, which consists only of the common nodes A, B, C, D, E, F, G and connections 6 between the said common nodes.

A preferred way to index the trajectory data in the first database 4 is to encode each trajectory according to the common routes by labelling each trajectory according to the common nodes which are passed by the respective trajectory. For example label "ACFE" indicates a trajectory that traversed from the bottom (A) to the left at point (C) and then to the right at point (F) and exits at point (E).

As a result the first database 4 comprises trajectory data indexed by the common routes which are represented by the common nodes A, B, C, D, E, F, G.

Returning back to FIG. 1 the VCM 1 comprises a graphical user interface GUI 7 which is realised to allow a user to formulate search queries and to display returning query results. The GUI 7 comprises preferably a typical peripheral user input device, like a computer mouse, a touch pad or screen, microphone for voice control or the like, which is used to formulate the search query in an intuitive, especially in a graphical manner. Alternatively the search query is formulated by numerical and/or letter symbol input.

The search queries are trajectory-based and are especially realised as an area-of interest search, line-crossing search, trajectory search, trajectory search by example or as a one-click trajectory search.

After the input of the search queries these are translated into terms of the common nodes A, B, C, D, E, F, G which are stored in the database 4. For example in the case of the area-of-interest search, whereby all trajectories from moving objects crossing a certain area shall be retrieved, the search is encoded into a query for trajectories having connected common nodes, whereby the line of the connected common nodes pass the specified area. For the example of the line-crossing search all trajectories are searched having a common node on the one hand side of a query line and a directly connected common node on the other side of the query line. In the case of trajectory search by sketching a trajectory on the video plane, the search trajectory is labelled according to the common routes in terms of the common nodes and the query label is searched for in the database 4.

After the translation of the search query in the GUI 7 the encoded query, also called query label, is sent to a processing unit 8 which communicates with the database 4 in order to retrieve trajectory data matching with the query label. As the queries are formulated in terms of common nodes A, B, C, D, E, F, G and the trajectory data in the database 4 is indexed also in terms of the common nodes A, B, C, D, E, F, G, the query is a very fast look-up operation to find trajectories with labels similar or identical to the query label. The retrieved trajectory data is transmitted via the processing unit 8 or directly to the GUI 7 and displayed as the result of the search query and comprises trajectory information and/or the video sequences of the moving objects.

Figure 3:
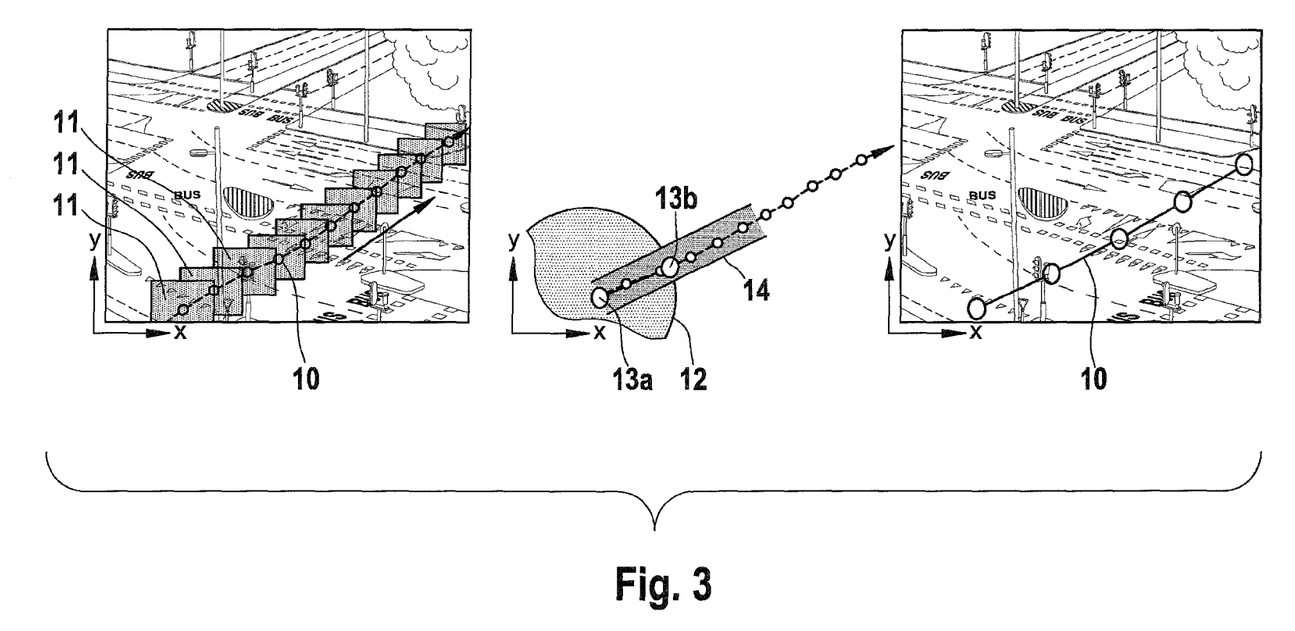

It shall be noted that the block diagram in FIG. 1 is only for the purpose of illustration and not limiting as the architecture and/or arrangement of VCA 3, database 4, GUI 7 and processing unit 8 may be realised in one single computer system or may be divided into separate computer systems linked directly and/or via a network or the internet The dashed lines in FIG. 1 indicate a possible alternative of the VCM 1. In addition to the first database 4 a second database 9 is provided comprising the trajectory data indexed in a hierarchical data structure for example in the structure of a R-tree or R*-tree. For the explanation of the hierarchical storage of trajectory data reference is made to the FIGS. 3 and 4. The first and the second database 4 and 9 may also be embodied in a common database comprising the trajectory data and the two different index structures, i.e. label index and further hierarchical index. Preferably a common pre-processing filtering step as explained in connection with FIG. 3 is performed. In operation of this alternative of the VCM 1 a search query is formulated by the user as described above. The search query is translated twice, whereby each translation is adapted for the respective index structure. So the query label and an adapted query for the further hierarchical structure is generated. Both queries are performed on the respective databases 4 and 9, whereby the database 4 will provide due to its optimised index structure a preliminary and early feedback to the user and the results from the second database 9 will be returned later. Alternatively, the query concerning the database 9 is cancelled in case the results from the database 4 are sufficient. In a further alternative first the query on database 4 is performed and—only in case the results are not sufficient and/or no results at all are returned—the query on database 9 is performed in a second step.

FIG. 3 illustrates schematically the optional filtering step to reduce trajectory data amount in the database 4 as well as in the database 9. On the left hand side an image with a trajectory 10 is shown, whereby the trajectory 10 is generated by single location points. The location points are within the bounding boxes 11 of the moving object, preferably positioned at the centre of the bounding boxes 11, whereby each bounding box 11 represent the position of the moving object in a frame of an image sequence. The trajectory 10 represented as set of location points is the input for a filtering algorithm as illustrated in the middle of FIG. 3. The set of location points are filtered by a spatial correlation algorithm, whereby all location points which are within a predetermined maximum distance defined by a circle 12 around a preceding filtered location point 13a and/or which are within a maximum direction deviation range defined by a tube 14, which is arranged around the location points, are cancelled. Optionally new location points 13b can be created in case no location point of the trajectory 10 lies on the circle 12 and the currently considered trajectory point lies outside the circle 12, and/or a new point can be created on the edge of tube 14 in case the currently considered trajectory point lies outside the tube 14. The output of the filtering algorithm is represented on the right side of FIG. 3 showing a smaller set of location points representing the trajectory 10.

Figure 4:
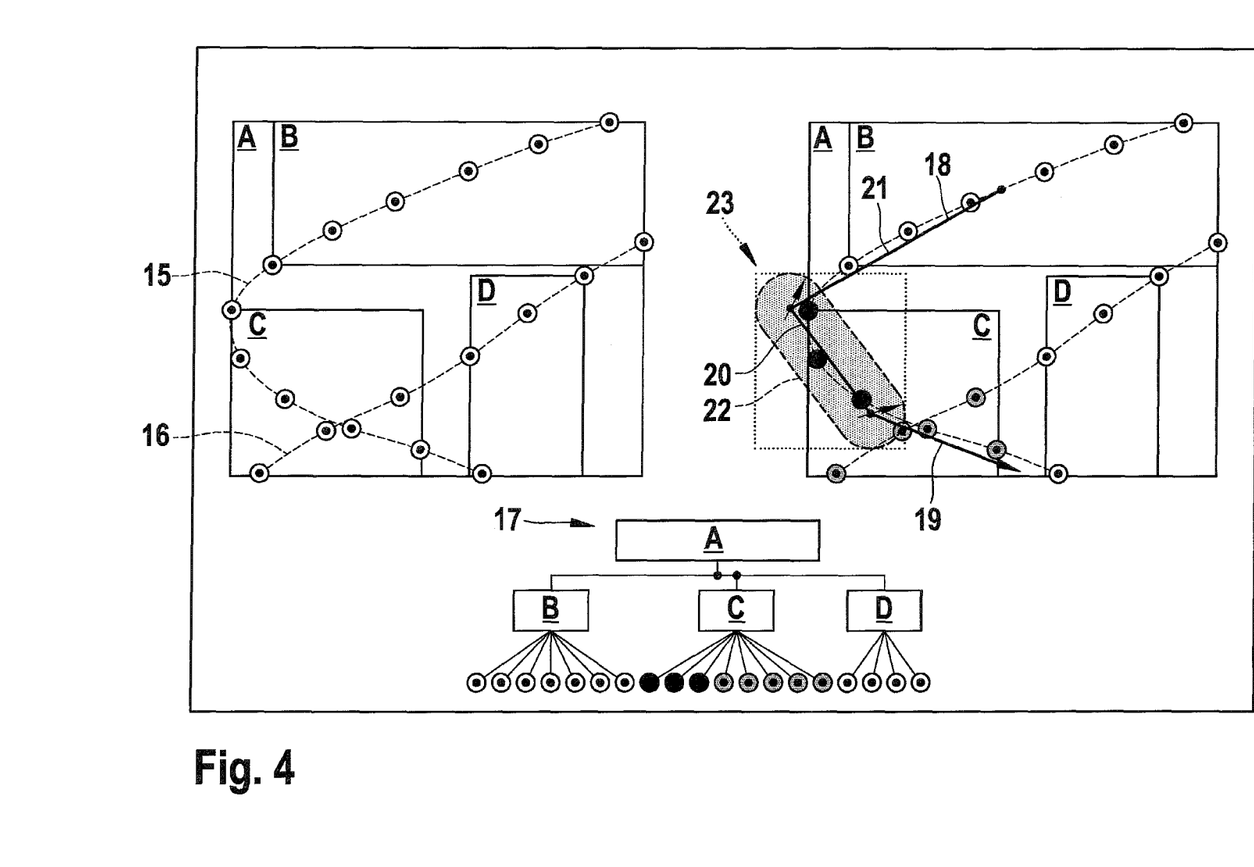

FIG. 4 illustrates the hierarchical storage of the filtered trajectory data in the database 9 and the respective database access method.

In the upper left corner of FIG. 4 filtered trajectories 15 and 16 with filtered location points are shown. These filtered trajectories 15 and 16 are filtered and/or pre-processed accordingly and/or by analogy with the trajectory 10 on the right side of FIG. 3 and are displayed in an analogical manner. So filtered trajectories 15 and 16 are further examples for a filtered trajectory like said trajectory 10. Each trajectory 15 and 16 is represented by a first minimum bounding rectangle A, which only carries the information about the outer limit and the position of the complete filtered trajectories 15 and 16. In a further step the filtered trajectories 15, 16 are split up into sub-trails which are represented by minimum bounding rectangles B, C and D respectively, whereby preferably the rectangles B,C and D are arranged within the rectangle A without overlap. The trajectory points are allocated to the minimum bounding area B, C and D in which the trajectory points are positioned.

In the lower part of FIG. 4 a tree-like data structure 17 is shown which could be realised as an R*-tree. The data structure 17 is indexed by the rectangles A, B, C and D and carries and/or is linked with the information about the trajectories and sub-trails. The small circles of the tree are called children of the tree and represent the actual stored trajectory points. So summarized the location points of the filtered trajectories 15 and 16 and further trajectories are distributed between the lowest level of the hierarchical structure, whereby the lowest level is indexed by the minimum bounding rectangles B, C and D.

In the upper right corner of FIG. 4 the database access method in case of a query on the basis of sketched query line-segments 18 concerning a trajectory is demonstrated. First the sketched query line-segments 18 are divided in query segments 19, 20 and 21. In the following the database access method in connection with the middle query segment 20 is described as an example. In a further step a range window 22 is placed automatically over the middle query segment 20 to define a limited matching range. The range window 22 has preferably a curved borderline, whereby the borders of the range window 22 are defined for example by a minimum distance to the trajectory points of the middle query segment 20 and/or to the middle query segment 20 itself. In a subsequent step the range window 22 is converted in a search minimum bounding rectangle 23. The search for matching trajectories and/or sub-trails of trajectories is only performed in the rectangles of the tree-like data structure 17 overlaying the search minimum bounding box 23, which are—for the example query segment 20—the rectangles A and C. Trajectory data concerning the rectangles B and D is not accessed.

The search for matching trajectories and/or sub-trails is carried out for all query segments 19, 20 and 21 of the sketched query line-segments 18. Finally and after merging the results from the query segments 19, 20 and 21 as a result a list of trajectories preferably in best-match order is returned.

The invention claimed:

1. A trajectory data retrieval system (1) for retrieving trajectory data of moving objects in a plurality of image sequences, the trajectory data retrieval system (1) comprising:
   a processor having a database (4) configured to store and index a set of common routes based on the trajectories of the moving objects, whereby each subset of the set of common routes is generated by a plurality of trajectories and whereby each subset is linked with the trajectory data of generating trajectories of said each subset, or parts thereof or of trajectories overlapping at least in part with the subset, querying means (7) configured to formulate a trajectory-based query, the querying means (7) comprising translating means for translating trajectory-based queries in terms of common routes, common nodes (A, B, C, D, E, F, G, H) or both, and retrieval means (8) configured to retrieve trajectory data linked to a matching subset of the set of common routes matching with the trajectory-based query, wherein the querying means (7) comprises means for formulating an area-of interest query, a line-crossing query or a trajectory-by-sketch query, a trajectory-by-example query, a one-click-trajectory query, or any combination thereof.

2. The trajectory data retrieval (1) system according to claim 1, wherein the set of common routes is represented by a network of connected common routes.

3. The trajectory data retrieval system according to claim 1, wherein one or each of the common routes or the set of common routes, the network of common routes or both is represented by a plurality of connected common nodes (A, B, C, D, E, F, G, H).

4. The trajectory data retrieval system according to claim 1, wherein the common routes or the trajectory-based query is expressed in, labelled by the common nodes (A, B, C, D, E, F, G, H) or both.

5. The trajectory data retrieval system according to claim 1, wherein the common routes, the common nodes (A, B, C, D, E, F, G, H) or both define an indexing structure for indexing the trajectories or trajectory data or the plurality of image sequences.

6. The trajectory data retrieval system according to claim 1, wherein the retrieved trajectory data comprises the number of matching trajectories or links to the image sequences relating to the matched trajectories.

7. The trajectory data retrieval system according to claim 1, wherein the image sequences, the trajectories or the trajectory data, or both are additionally indexed by an R*-tree algorithm.

8. The trajectory data retrieval system of claim 1, further comprising a second database (9), wherein the image sequences, the trajectories or the trajectory data, or both are additionally indexed by an R*-tree algorithm and stored in the second database (9).

9. A method for retrieval of trajectory data from a plurality of image sequences with moving objects comprising the steps of:

providing a processor;

providing querying means (7) in said processor configured to formulate a trajectory-based query;

providing retrieval means (8) in said processor configured to retrieve trajectory data linked and indexed to a matching subset of a set of common routes matching with the trajectory-based query;

formulating with said processor a trajectory-based query to retrieve the trajectory data exploiting the set of common routes based on the trajectories of the moving objects, whereby each subset of the set of common routes is generated by a plurality of trajectories and whereby each subset is linked with the trajectory data of generating trajectories of the subset or parts thereof, of trajectories overlapping at least in part with the subset or both, wherein the querying means (7) comprises means for formulating an area-of interest query, a line-crossing query or a trajectory-by-sketch query, a trajectory-by-example query, a one-click-trajectory query, or any combination thereof, the formulating including translating the queries in terms of common routes, common nodes (A, B, C, D, E, F, G, H) or both.

10. A non-transitory computer readable medium containing a computer program comprising program code means for performing a method for retrieval of trajectory data from a plurality of image sequences with moving objects comprising the steps of:

providing a processor;

providing querying means in said processor configured to formulate a trajectory-based query;

providing retrieval means in said processor configured to retrieve trajectory data linked and indexed to a matching subset of a set of common routes matching with the trajectory-based query;

formulating with said processor a trajectory-based query to retrieve the trajectory data exploiting a set of common routes based on the trajectories of the moving objects, whereby each subset of the set of common routes is generated by a plurality of trajectories and whereby each subset is linked with the trajectory data of generating trajectories of the subset or parts thereof or of trajectories overlapping at least in part with the subset, wherein the querying means (7) or the retrieval means (8) comprises translating means for translating trajectory-based queries in terms of common routes, common nodes (A, B, C, D, E, F, G, H) or both, the formulating including translating the queries in terms of common routes, common nodes (A, B, C, D, E, F, G, H) or both, when said program is run on a computer or on the system.

* * * * *